(12) United States Patent
Wen et al.

(10) Patent No.: US 6,852,215 B2
(45) Date of Patent: Feb. 8, 2005

(54) HEAVY OIL UPGRADE METHOD AND APPARATUS

(75) Inventors: Michael Y. Wen, Katy, TX (US); Eric D. Nelson, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 103 days.

(21) Appl. No.: 10/125,669

(22) Filed: Apr. 18, 2002

(65) Prior Publication Data

US 2003/0024854 A1 Feb. 6, 2003

Related U.S. Application Data

(60) Provisional application No. 60/285,212, filed on Apr. 20, 2004.

(51) Int. Cl.$^7$ ............................ C10G 45/00; C10G 9/00
(52) U.S. Cl. ....................... 208/209; 208/131; 208/107; 208/427; 422/187; 422/207; 422/198; 48/94; 48/95; 48/96
(58) Field of Search ................................ 208/107, 427, 208/209, 131; 48/94, 95, 96; 422/187, 207, 198; 431/2

(56) References Cited

U.S. PATENT DOCUMENTS

| | | | |
|---|---|---|---|
| 1,991,750 A | 2/1935 | Keeling | 196/67 |
| 4,118,925 A | 10/1978 | Sperry et al. | 60/39.05 |
| 4,234,407 A | * 11/1980 | Duncan et al. | 208/8 R |
| 4,294,686 A | 10/1981 | Fisher et al. | 208/56 |
| 4,298,457 A | 11/1981 | Oblad et al. | 208/107 |
| 4,415,431 A | 11/1983 | Matyas et al. | 208/8 R |
| 4,931,171 A | 6/1990 | Piotter | 208/409 |
| 5,069,775 A | 12/1991 | Grosboll | 208/108 |
| 5,133,941 A | 7/1992 | Hays et al. | 422/140 |
| 5,269,909 A | 12/1993 | Ovalles et al. | 208/370 |
| 5,817,229 A | 10/1998 | Sudhakar et al. | 208/299 |
| 5,883,138 A | 3/1999 | Hershkowitz et al. | 518/703 |
| 5,886,056 A | 3/1999 | Hershkowitz et al. | 518/703 |
| 5,922,090 A | 7/1999 | Fujimura et al. | 48/197 R |
| 5,935,489 A | 8/1999 | Hershkowitz et al. | 252/373 |
| 5,980,596 A | 11/1999 | Hershkowitz et al. | 48/127.9 |
| 5,980,782 A | 11/1999 | Hershkowitz et al. | 252/373 |
| 6,004,453 A | 12/1999 | Benham et al. | 208/108 |
| 6,016,868 A | 1/2000 | Gregoli et al. | 166/261 |
| 6,059,957 A | 5/2000 | Khan et al. | 208/108 |
| 6,267,912 B1 | 7/2001 | Hershkowitz et al. | 252/373 |

FOREIGN PATENT DOCUMENTS

| | | |
|---|---|---|
| WO | WO 00/18854 | 4/2000 |
| WO | WO 00/23540 | 4/2000 |
| WO | WO 00/61705 | 10/2000 |

OTHER PUBLICATIONS

J. K. Moll and F. T. T. Ng, "A Novel Process for Upgrading Heavy Oil/Bitumen Emulsions Via In Situ Hydrogen", Department of Chemical Engineering, University of Waterloo, Waterloo, Ontario, Canada, pp. 1–2, Mar. 9, 2000.

R. Paez, L. Luzardo, and J. Guitian, "Current and Future Upgrading Options for the Orinoco Heavy Crude Oils", Petroleos de Venezuela, S.A., Caracas, Venezuela, pp. 1–11, no date.

K. C. Williams, "Technology Evolution and Commercial Development at Imperial's Cold Lake Production Project", Imperial Oil Limited, Proceedings of the Sixteenth World Petroleum Congress, Calgary, Alberta, Canada, vol. 2, pp. 217–224, Jun. 11–15, 2000.

"Production Site Heavy–Oil Upgrader Shows Promise", Oil & Gas Journal, pp. 56–57, Nov. 20, 2000.

* cited by examiner

*Primary Examiner*—Walter D. Griffin
(74) *Attorney, Agent, or Firm*—Stephen P. Koch; Douglas J. Collins

(57) ABSTRACT

A method for upgrading a hydrocarbon in which an oxygen source and a hydrogen source are ignited and the resulting synthetic gas is used to initiate a predominantly gas phase heavy oil upgrade reaction. The upgrade reaction is quenched with an additional source of un-upgraded hydrocarbon.

11 Claims, 6 Drawing Sheets

HEAVY OIL UPGRADE METHOD AND APPARATUS

CROSS-REFERENCE TO RELATED U.S. APPLICATION

This application claims priority benefit from U.S. Provisional Application No. 60/285,212, filed on Apr. 20, 2001.

FIELD OF THE INVENTION

This invention relates to the upgrading of heavy oil into light oil.

BACKGROUND OF THE INVENTION

A substantial portion of the world's oil reserves comprise bitumens, which are sometimes referred to as tar sands, and heavy crude oils (collectively "heavy oil"). Heavy oil is difficult to produce, and, when produced, is difficult to market. Whether pipelines or shipping facilities are used as the transportation medium, the cost of transporting heavy oil is substantially higher than the cost for the transporting of light oil. Once heavy oil is delivered at a receiving refinery, more costly refinery processes are required to generate products suitable for the commercial marketplace. As a result, the economic value of heavy oil is lower than the value of light oil, and for that reason a significant percentage of the world's heavy oil reserves remain underutilized.

To alleviate this underutilization problem, numerous methods have been proposed to upgrade heavy oil. Although the terms "heavy oil" and "upgrade" can be defined using several different technical parameters, one parameter that is frequently used to characterize the quality of hydrocarbons is API gravity. Heavy oil is characterized by a generally low API gravity, for example but without limitation in the range of API 5 to API 25. Light oils have higher magnitude API gravities, for example in the range API 35 to API 50. The term "upgrade" refers to the process of increasing the API gravity of oil from a relatively lower API gravity to a relatively higher API gravity. For example, but without limitation, oil can be upgraded from API 5 to API 15, or from API 30 to API 40. Upgrade is a relative term, and is not limited to a specific initial API gravity value, or range, nor to a specific final API gravity value, or range. Finally, the phrase "heavy oil upgrade reaction" refers generically to the chemical activities that occur in the process of upgrading heavy oil.

Heavy oil upgrade methods sometimes involve pre-processing steps intended to increase the efficiency of the heavy oil upgrade reaction. For example, U.S. Pat. No. 4,294,686 discloses the preliminary distillation of the heavy oil stream into a light oil fraction and heavy oil fraction. The purpose of the preliminary distillation is to avoid the unwanted cracking and coking of the light oil fraction that might occur if that fraction were included in the input stream to the upgrade reactor. The light oil fraction that results is generally in a form satisfactory either for use in the production facility as a fuel or for transport to a refinery. However, preliminary distillation adds both cost and complexity to the overall upgrade process, and is useful only where the heavy oil is known to include a sufficient volume of light hydrocarbons.

Other proposed upgrade methods include the pre-processing step of mixing of an oil additive with the heavy oil. The resulting mixture is then input to an upgrade reactor. For example, U.S. Pat. No. 6,059,957 discloses the creation of an emulsion from the mixing of heavy oil and water. That disclosure also provides for the optional inclusion of an emulsion-stabilizing surfactant. U.S. Pat. No. 6,004,453 discloses the creation of a slurry from the mixing of a noncatalytic additive with the heavy oil. The publication of Moll, J. K. and Ng, F.T.T., "A Novel Process for Upgrading Heavy Oil/Bitumen Emulsions Via In Situ Hydrogen," 16th World Petroleum Congress, Calgary, Canada, June 2000, discloses use of an emulsion from a water-soluble dispersed catalyst. Each of these three methods has two general limitations however. First, the mixing step adds both cost and complexity to the overall upgrading process. Second, the additives cause the creation of waste materials during the upgrade reactions that must thereafter be appropriately processed and disposed. That processing and disposal also adds cost and complexity.

A third set of heavy oil upgrade methods include the step of using a reaction additive in the upgrade reactor to facilitate, or improve the efficiency of, the upgrade reaction. For example, the publication of Paez, R., Luzardo, L., and Guitian, J., "Current and Future Upgrading Options for the Orinoco Heavy Crude Oils," 16th World Petroleum Congress, Calgary, Canada, June 2000, discloses the use of coke or iron-based catalysts in the upgrading process. Disclosure WO 00/61705 discloses the use of a non-catalytic particulate heat carrier. U.S. Pat. No. 5,817,229 discloses the use of activated carbon, in the absence of added hydrogen, to both reduce the content of undesirable minerals and to upgrade the quality of the input crude. These methods have both of the limitations of the oil additive methods discussed above, namely added cost and complexity and increased waste material processing requirements.

The hydrogenation method of U.S. Pat. No. 5,069,775 reacts hydrogen and heavy oil for from five minutes to four hours in a preferred reaction temperature range of 800 to 900° F. (427 to 482° C.). U.S. Pat. No. 5,269,909 discloses a method whereby a gas rich in methane is reacted with heavy oil for at least thirty minutes in a preferred temperature range of 380 to 420° C. (716 to 788° F.). The method of U.S. Pat. No. 5,133,941 flows hydrogen and heavy oil through sequentially connected reaction passageways in a preferred temperature range of 700 to 900° F. (371 to 482° C.). As will be understood to those skilled in the art, a limitation of these methods is that the generally long reaction durations cause a substantial increase in the generation of undesirable waste materials, specifically pitch, coke, and olefins. These materials create significant disposal challenges for the processing facility, and, in addition, lead to a reduction in the efficiency of the facility.

Disclosure WO 00/18854 discloses a two-part process in which hydrogen gas is mixed with heavy oil in a manner that attempts to achieve molecular level dispersion of hydrogen throughout the heavy oil. The method has a first upgrade reaction that separates the lighter hydrocarbons from the heavy oil, and continues with a second upgrade reaction in a second reactor. The second upgrade reaction further upgrades the heavy oil via a hydrogenation reaction within a preferred temperature range of 343 to 510° C. (650 to 950° F.). The method includes the added step of providing externally supplied heat to the hydrogen-heavy oil mixture to further facilitate the reaction in the second reactor. Limitations of this process include the difficulty of achieving the required uniform mixing of hydrogen and heavy oil, and the cost and complexity of implementing a process that requires two reaction steps.

These and other previously proposed upgrade methods suffer from an inherent limitation that has long plagued industry. On one hand, it is well known to those skilled in the art that upgrade reactions are preferably carried out at the highest possible reaction temperature, since upgrade processes are more efficient at higher temperatures. Unfortunately, as is also well known to those skilled in the art, high reaction temperatures can lead to significant unwanted cracking and coking of the heavy oil molecules if the reactions are not quickly quenched. None of these methods have a mechanism for quickly quenching the reactions and they are therefore constrained to lower temperature operating ranges. On the other hand, however, reaction durations are longer at lower temperatures, and it is equally well known that long reaction also lead unwanted cracking and coking, and, in addition, to lower process efficiencies due to the extra time required for the upgrade. These methods are therefore constrained to a compromise temperature range that is a tradeoff between these limitations.

WO 00/23540 discloses a method in which a jet of gas, comprising essentially of superheated steam, activates the upgrading of the heavy oil. The method has a number of limitations. Using steam as the hydrogenation mechanism means that both hydrogen and oxygen-hydrogen radicals are generated in the upgrade reactions. As a result, fewer hydrogen molecules are available, in comparison to processes in which hydrocarbon-based gases are predominantly used, to saturate the carbon radicals created from the heavy oil carbon bond breaking. In addition, a large volume of superheated steam is required. Because steam generation is endothermic, this constraint is costly, self-limiting, and inherently inefficient—fuel is consumed to generate steam, but the energy in that steam is only passively used to provide a thermal input to the upgrading of the heavy oil. Thus energy losses are incurred both in the generation of the steam and in the passive upgrade. This limits the efficiency of the upgrading process.

Another limitation of WO 00/23540 is that the bonding of oxygen-hydrogen radicals from the steam with carbon radicals from the heavy oil creates an output product in an emulsion form. Emulsions are a less desirable product at refineries due to the need to handle the increased volume of produced water that results during the refining process. Emulsions also add the requirement for a post-reaction soaking drum to ensure stabilization of the output products. Because soakers cannot quickly quench upgrade reactions or actively control stabilization times, this limitation leads to the creation of pitch and other unwanted waste materials.

Finally, WO 00/23540 is also constrained by the use of steam as the predominant hydrogenation source for the upgrade reaction. Steam causes side reactions that cannot be completely inhibited except under a narrow range of pressure and temperature conditions. Outside that range, unwanted gases and waste products are generated, and the output product suffers a loss of stability. As a result, reaction temperatures are generally limited to 500° C. (932° F.) or less, another efficiency constraint.

It is apparent that a need exists for a method that can be carried out without a preliminary distillation step, and without the use of oil or reaction additives. The method should avoid unwanted cracking and coking of the heavy oil, and minimize the production of undesirable waste materials. The output product should not be an emulsion. The upgrade efficiency of the method should not require uniform dispersion of hydrogen or other input gas throughout the heavy oil, or require relatively long exposure durations of the input gas to the heavy oil.

Furthermore, a need exists for a method that can preferably be carried out at high temperatures, to thereby facilitate short reaction times and high upgrade efficiencies. The method should involve a direct mechanism of transferring the heat input to the heavy oil to be upgraded. The method should include an active mechanism for quickly quenching the upgrade reactions. The present invention satisfies these requirements.

SUMMARY

This invention relates generally to the upgrading of liquid hydrocarbons. Specifically, this invention relates to a method for upgrading a hydrocarbon in which an oxygen source and a hydrocarbon-containing fuel mixture are ignited. Heat generated by that ignition vaporizes a portion of the hydrocarbon and initiates a predominantly gas phase upgrade reaction.

BRIEF DESCRIPTION OF THE DRAWINGS

The features of the present invention will become more apparent from the following description in which reference is made to the drawings appended hereto. Reference numbers that are used in more than one of the drawings refer to the same function in each drawing.

Figure 1:
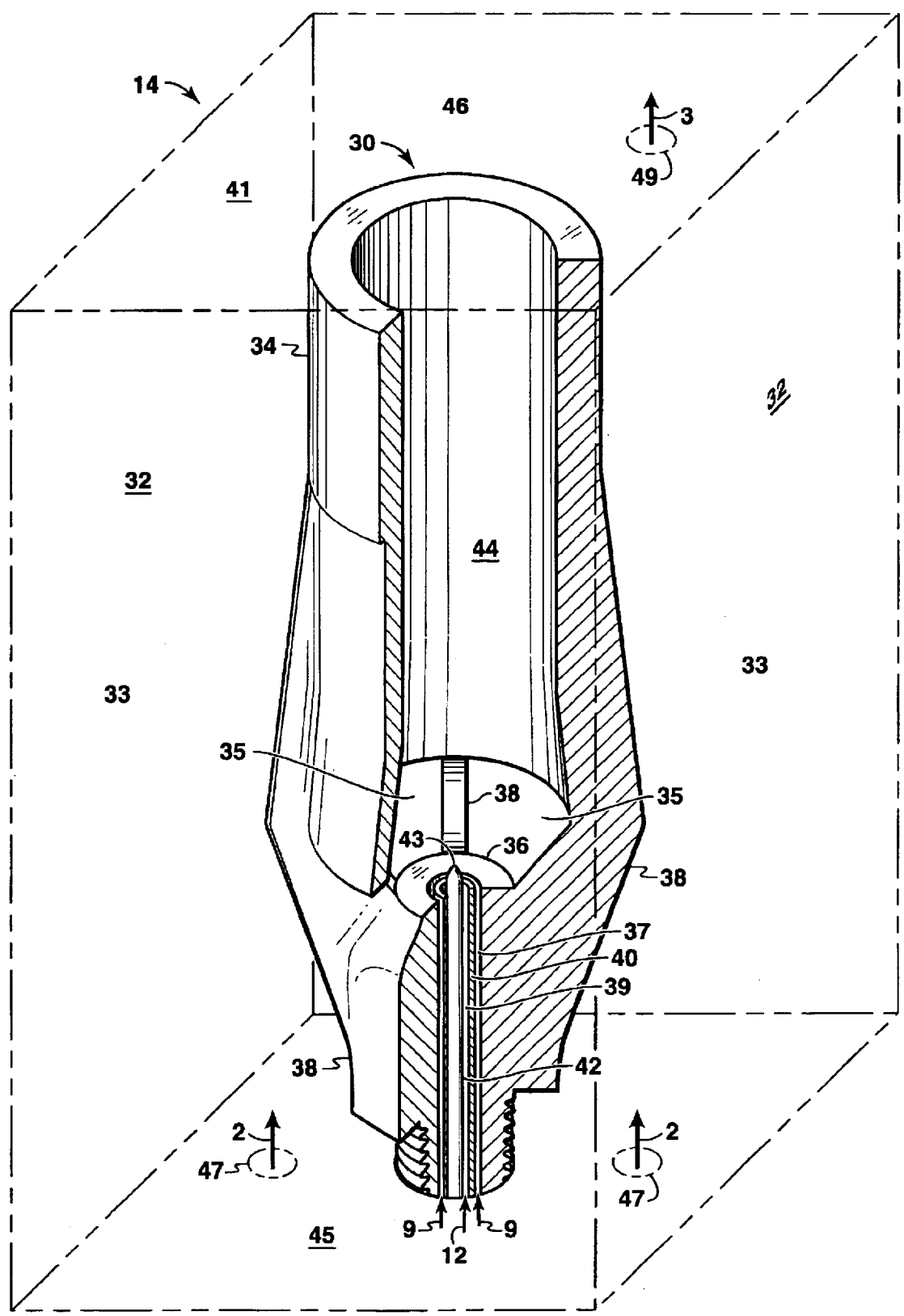
FIG. 1 is a sectional-view of an embodiment of an injection reactor that may be used in the method of the present invention.

Changes and modifications in the specifically described embodiments can be carried out without departing from the scope of the invention, which is intended to be limited only by the scope of the appended claims.

DETAILED DESCRIPTION OF THE INVENTION

The present invention is directed to the upgrading of heavy oil, and is often referred to as the "Partial Crude Upgrading" ("PCU") process. The PCU process can upgrade oil in one step, without the need for a preliminary distillation or for oil or reaction additives. These advantages increase the simplicity and lower the cost of the PCU process in comparison to previously proposed heavy oil upgrade techniques.

The PCU process rapidly heats heavy oil, thereby quickly breaking carbon bonds in the heavy oil molecules. This characteristic shortens the time required for the overall upgrade process and increases the efficiency of the entire upgrade facility. The reactions are quickly quenched by unreacted, in other words un-upgraded, heavy oil. This active quenching technique reduces both the amount of coking that typically occurs when upgrade reactions are not quickly controlled and the production of other unwanted waste materials.

The upgrade reaction for the PCU process is initiated by the injection of compressed air and a fuel mixture into a reactor vessel. Extremely high reaction temperatures result from the ignition of those gases by igniters in the injectors. These temperatures result from an exothermic reaction that releases a high amount of energy for the vaporization of, and cracking of the molecular bonds in, the heavy oil molecules. The heavy oil upgrade results from the exposure of the heavy oil molecules to the energy released by the exothermic reaction. The exothermic generation of energy is an important aspect of the present invention in comparison to previous methods, because an increased amount of energy thereby becomes available for the breaking of the molecular bonds in the heavy oil.

The energy in the PCU process results from the partial oxidation reaction of compressed air with the fuel mixture. The compressed air acts as the oxidizing agent and the fuel mixture as the hydrogen source in the reaction which creates a synthetic gas, referred to as syngas. The creation of syngas allows high temperatures to be exothermically created for the upgrade reaction, and shortens upgrade reaction times compared to previously proposed upgrade techniques. Syngas also contains reactive gas components that facilitate the upgrade reaction, and preferably generates an oversupply of hydrogen radicals for bonding with carbon radicals created by the upgrade reactions. Having carbon radicals bond with hydrogen rather than with other undesirable radicals, a result which typically occurs from the use of gases which are predominantly composed of superheated steam, reduces the likelihood that the output product will be an undesirable emulsion or that coke, pitch and unstable olefins will be created.

Gaseous hydrocarbons, such as natural gas, are the preferred fuels to generate syngas, because of their high concentration of hydrogen. However, either liquid fuels or heavy oil feeds may be used in syngas generation. Furthermore, either air, enriched air (e.g. air enriched with additional oxygen), or pure oxygen may be used as the oxygen source. The reactor vessel within which the heavy oil cracking and quenching takes place may operate at pressures below 700 psig (4,928 kPa), and more preferably may be operated at pressures below 400 psig (2,859 kPa).

The reactions are quenched in the same reactor vessel using unreacted heavy oil, which is at a lower temperature than is the upgraded heavy oil. Quenching occurs shortly after exposure of the heavy oil to the syngas. Control of the reactor pressures, and the rate of input of air, fuel, and unreacted heavy oil, provides for a method of controlling the rate at which the reactions are quenched.

The PCU process facilitates synergies between fuel and heat integration and the production facilities. Fuel gas produced by the PCU process may be used to generate high-pressure steam, which may be used, for example, to assist heavy oil production or to preheat the feeds to the reactor vessel. Alternatively, the fuel gas may be fed to gas turbines to generate power to support the production facility.

FIG. 1 depicts an embodiment of an injection reactor that may be used in the method of the present invention. In FIG. 1, injection reactor 14 consists of outer walls 32, upper wall 41, and lower wall 45, with ignition injector 30 centrally installed within injection reactor 14. The embodiment of FIG. 1 is simplified for descriptive purposes only. For example, ignition injector 30 is depicted in an oversize dimension compared to injection reactor 14. As will be understood to those skilled in the art, one or more ignition injectors will be employed in injection reactor 14 to achieve generally uniform upgrade reactions and reaction quenching, and the dimensional proportions of ignition injector 30 compared to injection reactor 14 will be determined from the intended throughput capacity of the upgrade facility.

The embodiment of ignition injector 30 in FIG. 1 is similar to an eduction-type mixing nozzle, preferably made with high-temperature resistant alloys, which has been fitted with a centrally located igniter 42. Ignition injector 30 comprises injector wall 34, and injector base 36. Injector base 36 is connected to injector wall 34 by injector struts 38. In this embodiment injector base 36 is connected to lower wall 45 of injection reactor 14 by screw threads. It will be understood that the method of the present invention is not limited to the use of a screw-thread connection, nor to connection of ignition injector 30 at the base of injection reactor 14, nor to the location of inlets 47 and outlet 49, which allow flow into and out of the top and bottom of injection reactor 14, respectively, and that the geometry in FIG. 1 has been chosen for exemplary purposes only. Injector conduit 40 is centrally located within injector base 36. Igniter 42 in turn is centrally located within injector conduit 40.

Heated compressed air 12 is fed into reaction chamber 44 through air input annulus 39 created between injector conduit 40 and igniter 42. Igniter 42 may be any hot-surface or sparking igniter that provides reliable ignition of gases. Heated fuel mixture 9 is fed into reaction chamber 44 through fuel input annulus 37 created between injector base 36 and injector conduit 40. Heavy oil is input into reaction chamber 44 through input slots 35, which are openings between injector struts 38 which allow flow from outer annulus 33 between outer wall 32 and ignition injector 30 to reaction chamber 44.

Tip 43 of igniter 42 ignites heated compressed air 12 and heated fuel mixture 9 to create high temperature syngas in the lower portion of reaction chamber 44 adjacent to struts 38. Heated heavy oil 2 flows into injection reactor 14 through inlets 47 in lower wall 45 and enters reaction chamber 44 through input slots 35 of ignition injector 30 and, upon contact with high temperature syngas, is rapidly subjected to a heavy oil upgrade reaction within reaction chamber 44. The flow of heated heavy oil 2 through input slots 35 results from an eduction force created from the mass momentum generated from the ignition of the gases that generates the syngas. The rapid heavy oil upgrade reaction results predominantly from the vaporization of a portion of heated heavy oil 2 when heated compressed air 12 and heated fuel mixture 9 are ignited, however, an heavy oil upgrade reaction will also occur within any unvaporized heavy oil within reaction chamber 44. Both the vaporized and any unvaporized upgraded heavy oil flow out of reaction chamber 44 into mixing chamber 46, which is the open area in injection reactor 14 below upper wall 41 but above ignition injector 30. To prevent undesirable secondary reactions, the heavy oil upgrade reaction is rapidly quenched by mixing the outflow of reaction chamber 44 with additional heated heavy oil 2 in mixing chamber 46. The additional heated heavy oil 2 flows through reactor annulus 33 to mixing chamber 46. The resulting upgraded oil mixture 3 flows out of upper wall 41 of injection reactor 14 through outlet 49 by pressure drive after a residence time in mixing chamber 46, preferably of 1 to 60 minutes, and more preferably 2 to 20 minutes, which further stabilizes upgraded oil mixture 3. Injection reactor 14 may operate under mild pressures, generally below 700 psig (4,928 kPa) and preferably below 400 psig (2,859 kPa).

The syngas generated within reaction chamber 44 will generally have a temperature above 1200° F. (649° C.), preferably within the range of 1200 to 3000° F. (649 to 1,649° C.) and more preferably within the range of 1400° to 2400° F. (760 to 1,316° C.), to rapidly upgrade heated heavy oil 2. Natural gas is the preferred fuel for syngas generation due to its high hydrogen content. The term natural gas refers generally to gaseous hydrocarbon mixtures, for example containing such components as methane, ethane, and propane. Natural gas may also contain sulphur and trace amounts of various metals. However, any hydrogen-containing fuel source, such as liquefied petroleum gas or naphtha, may be used as fuel for syngas generation. Alternatively heavy feeds such as the heavy crude itself, petroleum residual oils and cokes may be used to generate syngas for upgrading.

The reaction time in reaction chamber 44 will preferably be ten seconds or less, and more preferably less than 2 seconds, to limit secondary cracking reactions. The velocities of heated fuel mixture 9 and heated compressed air 12 into reaction chamber 44 should preferably be relatively high to prevent damage to ignition injector 30 from the ignition reaction that creates the syngas. A minimum velocity of 10 ft/sec (3 m/s) is preferred, although, depending on the alloy from which ignition injector 30 is fabricated, lower velocities may be used. Depending on the velocities used, the reaction zone of the heavy oil upgrade reaction may extend beyond the lower portion of reaction chamber 44, and possibly into chamber 46.

A preferred ignition injector is an eduction-type injection nozzle, as depicted in FIG. 1, that has a conical shaped chamber to facilitate both the ignition of heated compressed air 12 and heated fuel mixture 9, and the cracking of the heavy oil molecular bonds. In the design depicted in FIG. 1, with a centrally-located igniter installed within the injection nozzle, the partial oxidation reaction is believed to primarily occur at the center of reaction chamber 44, with a portion of heated heavy oil 2 flowing along the inner surface of injector wall 34, thereby serving as a protective film for the inside surface of injector wall 34.

It will be understood that injector 30 and igniter 42 are not necessarily limited to the geometry of the embodiment depicted in FIG. 1. Although a coannular-type injector is preferred to achieve fast ignition of the fuel and air mixture and to avoid flashback, any injection igniter that is capable of generating syngas without injector damage can be used. Furthermore, instead of inputting heated compressed air 12 and heated fuel mixture 9 through concentric annuli within injector base 36, separate input lines could used to input heated compressed air 12 and heated fuel mixture 9 into reaction chamber 44. Similarly, heated heavy oil 2 could be input through a separate, nonconcentric input line. Depending on the geometry and length of injector wall 34, heated heavy oil 2 could be input to the upper portion of reaction chamber 44 through slots in the top of injector wall 34, thereby further facilitating the reaction quenching. Each of the examples in this paragraph are not depicted in FIG. 1, but will be understood to one skilled in the art, who will also recognize other implementation examples of suitable ignition injectors based on the teachings of this description.

Figure 2:
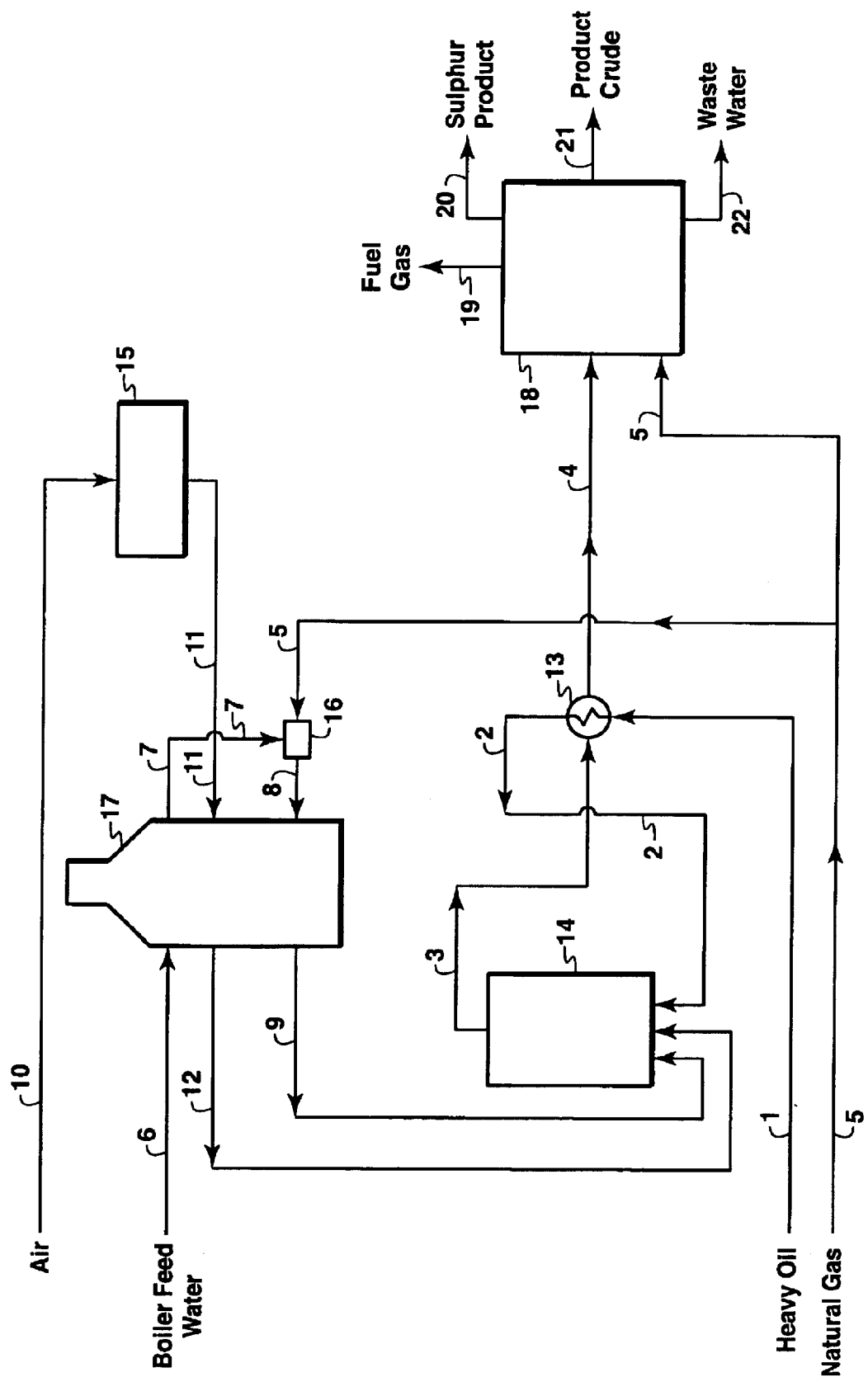
FIG. 2 is a schematic representation generally illustrating one embodiment of a heavy oil upgrade method of the present invention.

FIG. 2 depicts a simplified schematic of one embodiment of the use of injection reactor 14 in the method of the present invention. Heavy crude 1 from any source is preheated in heat exchanger 13 to generate heated heavy oil 2, which is input into injection reactor 14. The temperature of heated heavy oil 2 is preferably low enough to minimize thermal cracking of the oil molecules, and for most heavy oil will range from 300 to 800° F. (149 to 427° C.), and more preferably from 400 to 600° F. (204 to 316° C.).

Air 10 is compressed in air compressor 15. Compressed air 11 is heated in furnace 17 to a temperature preferably between 500 and 1500° F. (260 to 816° C.), and more preferably between 500 and 1200° F. (260 to 649° C.). Heated compressed air 12 is then input to injection reactor 14. As noted above, other sources of oxygen molecules may be used. It will be understood that preheating of heavy crude 1 or compressed air 11 are not requirements of the present invention, but are preferable to increase the efficiency of the upgrade reaction. Steam 7 is created from the heating of boiler feed water 6 in furnace 17. Natural gas 5 mixes with steam 7 in mixer 16, and is heated in furnace 17 to a temperature preferably between 500 and 1200° F. (260 to 649° C.). The heated fuel mixture 9 that results is input to injection reactor 14.

As described above in conjunction with FIG. 1, ignition of heated compressed air 12 and heated fuel mixture 9 in the presence of heated heavy oil 2 initiates the upgrade reaction. It is preferable if multiple ignition injectors 30 are uniformly spaced within injection reactor 14 to facilitate the maximum throughput and efficiency of the upgrade facility. The exact number of ignition injectors 30 will depend on the size of injection reactor 14 and the desired throughput volume of the upgrade facility. Also as described above, the output of injection reactor 14 is upgraded oil mixture 3.

A small amount of solid materials, preferably less than five weight percent, may optionally be mixed (not shown in the drawings) with heated heavy oil 2 before it is input to injection reactor 14 to control potential deposits within injection reactor 14. These solids can be either inert, such as sand, or reactive, such as coal.

In this embodiment, upgraded oil mixture 3 is used as a heat source for heat exchanger 13. Cooled upgraded heavy oil 4 is then input to a conventional separator 18, which produces product crude 21, fuel gas 19, sulfur product 20, and waste water 2.

To fully appreciate the present invention, it is useful to contrast the PCU process with the manner in which previously proposed methods upgrade heavy oil. The variety of previously proposed methods have been directed to a liquid phase heavy oil upgrade reaction in which the molecular bonds in liquid phase heavy oil are broken and the resulting carbon radicals combined with available hydrogen radicals to create a stabilized upgraded heavy oil.

In contrast, the PCU process focuses on a predominantly gas phase heavy oil upgrade reaction. Specifically, heat released during the formation of syngas vaporizes a portion of heavy oil, thereby allowing a gas phase heavy oil upgrade reaction to occur. This vaporization and gas phase reaction occurs much more quickly than does a liquid phase reaction, with the hydrogen within the syngas simultaneously available to bond with the heavy oil's carbon atoms. Although the process may be carried out at high pressures, high pressures are not necessary to facilitate this gas phase reaction, thereby allowing lower pressures to be used if desired. In addition, hydrogen and carbon molecules bond more readily in the gas phase, further facilitating short upgrade reaction times and high upgrade process efficiencies.

Because the PCU process' gas phase upgrade reaction occurs quickly, a method of rapidly quenching the upgraded heavy oil is also necessary. Because the temperature differential between the upgraded vaporized heavy oil and the un-upgraded heavy oil is large, additional un-upgraded heavy oil quickly quenches the upgrade reaction and thereby prevents the generation of unwanted waste materials. The temperature differential is much less in liquid phase techniques, and therefore the reactions in those techniques cannot be quenched as quickly and unwanted waste materials cannot be avoided to the same extent as in the PCU process.

Applicant's invention takes advantage of presently available components to facilitate fabrication of reliable heavy oil upgrade facilities. For example, ignition injector 30 must allow air and fuel to flow into reaction chamber 44. This requirement can be met by nozzles which have long been used to circulate and mix fluids in closed and open tanks. One example of nozzles which may be modified to meet the requirements of ignition injector 30 are the TurboMix™ products of BETE Fog Nozzle, Inc. of Greenfield, Mass. Similarly, igniter 42 may be based on hot surface igniters which have long been used in gas appliances. For example, the MINI-IGNITER line of products of Saint-Goban/Advanced Ceramics-Norton Igniter Products of Milford, Mass. could be modified to meet the needs of the PCU process. Advantages of hot surface igniters, as compared to sparking-type igniters, include low input power requirements and safer operation. The ability of Applicants' invention to build on presently available technologies and component parts—in each case from diverse and previously unrelated areas of commerce—is a unique characteristic of the PCU process and an important advance over previously proposed heavy oil upgrade processes.

In distinguishing the PCU process from previously disclosed methods, applicants are not bound by any specific physical, chemical, or mechanical theory of operation. Applicants have set forth these theories in an effort to explain how and why the invention is believed to work. These theories are set forth for informational purposes only, and are not to be interpreted as limiting in any way the true spirit and scope of the present invention.

Figure 3:
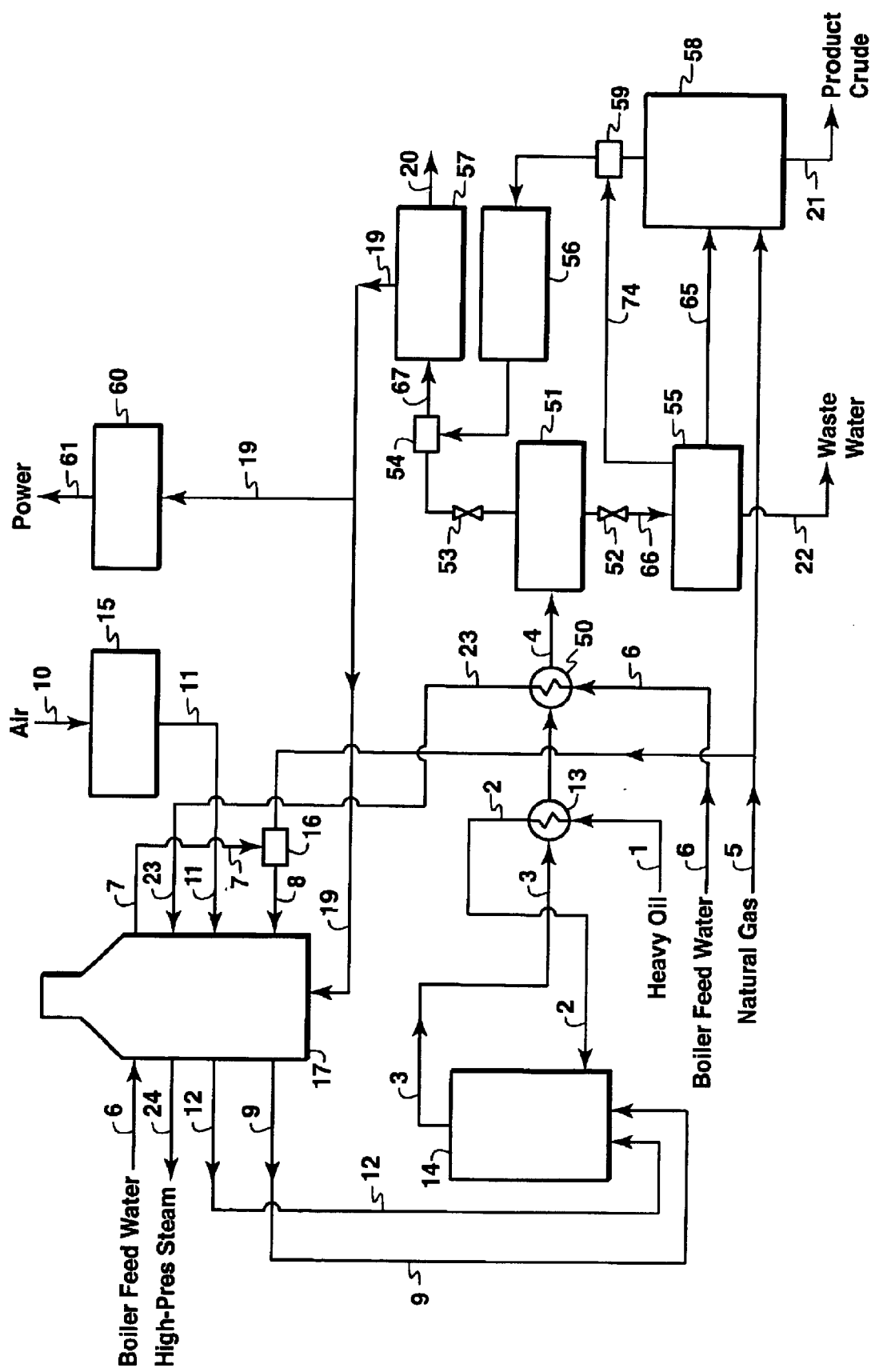
FIG. 3 is a more detailed schematic representation of the heavy oil upgrade method illustrated in FIG. 1, with an expanded illustration of heat exchanger and separation equipment.

A second embodiment of the PCU process is shown in FIG. 3. This embodiment provides an example of the upgrade efficiencies that result from implementation of the PCU process. In FIG. 3 the operation of heat exchanger 13, injection reactor 14, air compressor 15, mixer 16, and furnace 17 are as described above.

In this configuration, upgraded oil mixture 3 is subjected to a second heat exchanger 50 for further cooling before being input as cooled upgraded heavy oil 4 to gas-liquid separator 51. An efficiency of this implementation is that boiler feed water 6 can be used as the cooling medium for heat exchanger 50, with heated boiler feed water 23 then being input to furnace 17. The result is a second source of water to furnace 17 to generate steam 7, or, alternately, to generate a separate high-pressure steam supply 24 for such applications as enhanced oil recovery.

Gases separated from gas-liquid separator 51 are sent through an expansion device, such as a Joule-Thomson valve, 53 and mixer 54 before being input as gas 67 to gas treating unit 57. The output of gas treating unit 57 is fuel gas 19 and sulfur product 20. In this embodiment, sulfur product 20 will most likely be hydrogen sulfide gas, as will be understood to those skilled in the art. As a result, product crude 21 will have a lower sulfur content than does heavy oil 1. Another efficiency of this embodiment is that fuel gas 19 can be used as power source for furnace 17, and, or in the alternative, as power source for turbine 60 to generate power 61.

Liquids separated from gas-liquid separator 51 are sent through expansion device 52 to generate liquid product 66, which is input to liquids separator 55. Waste water 22, if generated, results from liquids separator 55. Any extraneous gas 74 not previously separated is sent to mixer 59, where it mixes with gas withdrawn from stripping tower 58. That mixture is compressed in tail gas compressor 56, and input to mixer 54. Hydrocarbon liquids 65 from separator 55 are sent to stripping tower 58 to generate product crude 21.

Process simulations of the PCU process have been carried out. Numerous process simulation-modeling programs are commercially available; one example is the HYSYS™ program, version 2.2, a product of Hyprotech Ltd., a subsidiary of AEA Technology plc. Other such programs will be known to those skilled in the art. Table 1 provides typical operating temperatures, pressures, and flow rates at various stages of the PCU process, and is cross-referenced to the reference numbers in FIG. 3. For simplicity, the process simulation results depicted in Table 1 used an assumed mixture of heavy paraffins and sulfur-containing paraffinic compounds to represent heavy oil 1. Specifically, a mixture of 50% of n-$C_{30}H_{62}$ and 50% of n-$C_{30}H_{61}SH$ was assumed to represent heavy oil. The simulations assumed that a 40% portion of the heavy oil input stream reacted with syngas for complete conversion into cracked products via the following two reactions:

1) n-$C_{30}H_{61}SH + H_2 \rightarrow$ n-$C_{30}H_{62} + H_2S$
2) n-$C_{30}H_{62} + x\ H_2 \rightarrow$ Cracked products The cracked products were assumed to be mixture of compounds having individual carbon sequences ranging from 1 to 22 carbon molecules long. The assumed cracking chemistry yields 6.6% of gases with one to four carbon molecules and the overall hydrogen consumption is 268 scf/bbl. Sensitivity tests were performed for mixtures having assumed carbon sequences ranging from 1 to 28 molecules long, and with a cracking gas yield of 4.7% and overall hydrogen consumption of 230 scf/bbl, without substantial differences from the results summarized below.

The simulation assumed that 10% of the carbon monoxide within the syngas reacts with water to form additional hydrogen molecules for bonding with the heavy oil radicals. The simulation assumed that the unreacted 60% of the heavy oil input stream was used to quench the upgrade reaction.

The simulation results in Table 1 demonstrate the benefits of the PCU process. The 0.6 ratio of steam 7 to natural gas 5 is lower than is required in previously disclosed heavy oil upgrade techniques. As a result, the process generates a low volume of wastewater 22. In addition, product crude 21 does not suffer output volume reductions that are typical of many heavy oil upgrade techniques. Product crude 21, which consists of a mixture on a mole-percent basis of 61.8% of cracked heavy oil components and 38.2% of uncracked heavy oil, has been upgraded by API 6.8 in comparison to heavy oil 1.

TABLE 1

Simulation Results for PCU Process Embodiment of FIG. 3

| Process Reference | Flow Volume | Flow Volume Kgmole/hr | Temperature °F. | Temperature °C. | Pressure psia | Pressure Kpa | Oil Quality API |
|---|---|---|---|---|---|---|---|
| Heavy Oil 1 | 40,000 bbl/day | 528.4 | 199.5 | 93.1 | 169 | 1,165 | 32.8 |
| Natural Gas 5 Input to Mixer 16 | 9.1 mscf/day | 453.6 | 80 | 26.7 | 178.5 | 1,231 | |
| Steam 7 | 10,810 lb/hr | 272.2 | 372.8 | 189.3 | 178.5 | 1,231 | |
| Heated Boiler Feed Water 23 | 551,000 lb/hr | 13,870 | 357.2 | 180.7 | 1520 | 10,480 | |
| Heated Compressed Air 12 | 96,400 lb/hr | 1,518 | 1050 | 565.6 | 177 | 1,220 | |
| Heated Fuel Mixture 9 | 27,830 lb/hr | 725.8 | 1050 | 565.6 | 177 | 1,220 | |
| Syngas Generated within Injection Reactor 14 | 124,230 lb/hr | 2,768 | 2237 | 1,225 | 167 | 1,151 | |
| Heated Heavy Oil 2c | 40,000 bbl/day | 528.4 | 500 | 260 | 167 | 1,151 | |
| Upgraded Heavy Oil 3 | 635,400 lb/hr | 3,295 | 752.8 | 400.2 | 160 | 1,103 | |
| Cooled Upgraded Heavy Oil 4 | 635,400 lb/hr | 3,295 | 120 | 48.9 | 112.5 | 776 | |
| Liquid Product 66 | 507,600 lb/hr | 1,255 | 118.9 | 48.3 | 14.8 | 102 | |
| Sour Crude 65 | 40,840 bbl/day | 846.1 | 118.9 | 48.3 | 14.8 | 102 | |
| Natural Gas 5 Input to Stripping Tower 58 | 910 kscf/day | 45.4 | 69.2 | 20.7 | 15.8 | 109 | |
| Gas 67 | 135,600 lb/hr | 2,147 | 110 | 43.3 | 45 | 310 | |
| Wastewater 22 | 991 bbl/day | 363.6 | 118.9 | 48.3 | 14.8 | 102 | |
| Exhaust Gas from Furnace 17 | 279 mscf/day | 13,880 | 505.8 | 263.2 | 14.8 | 102 | |
| Product Crude 21 | 40,620 bbl/day | 829.3 | 117.4 | 47.4 | 15.8 | 109 | 39.6 |

Figure 4:
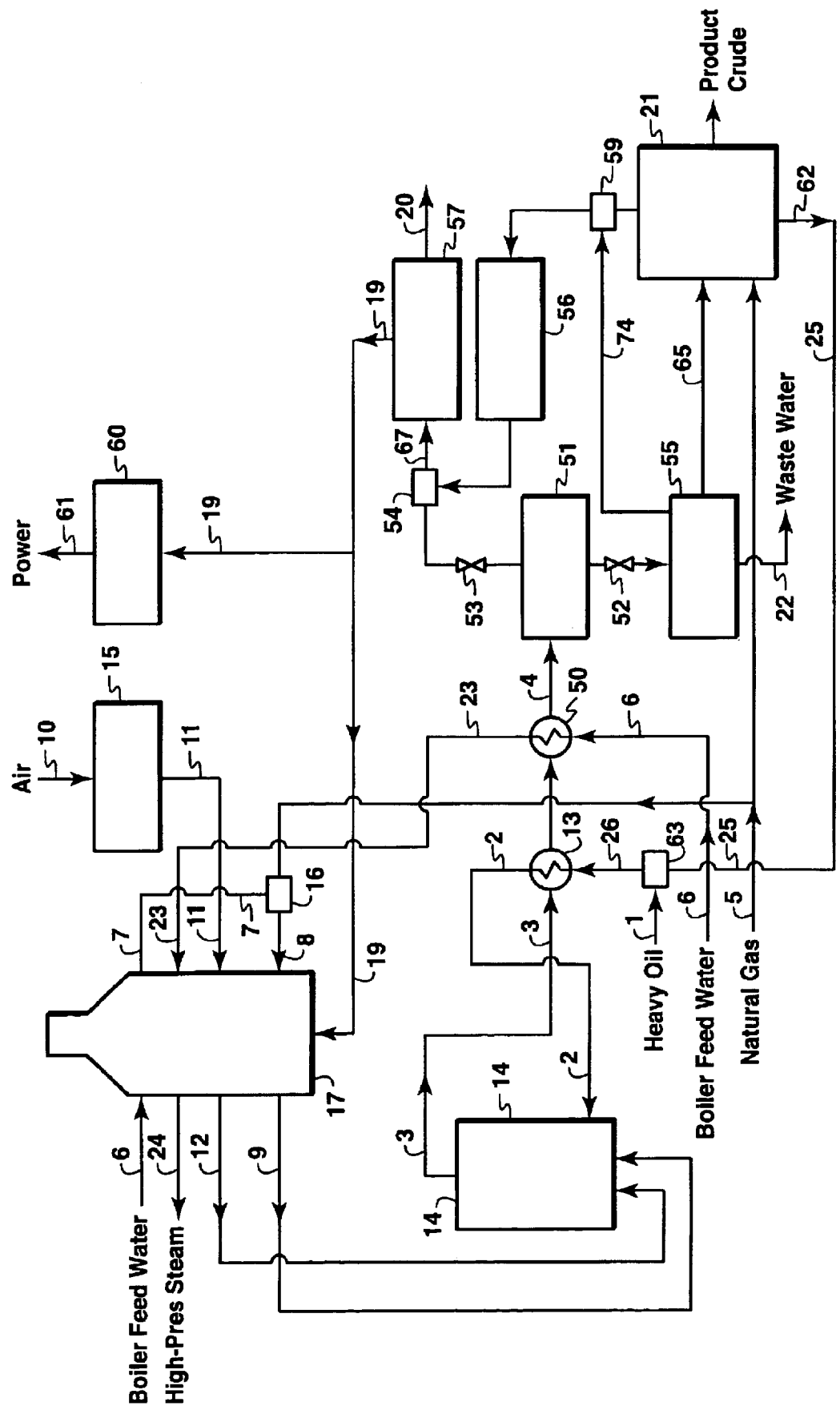
FIG. 4 is similar to FIG. 3, except that recycled unreacted heavy oil is added to the input to the injection reactor of the method of the present invention.

FIG. 4 depicts an embodiment of the PCU process similar to the embodiment of FIG. 3, except that distillation tower 62 replaces stripping tower 58 and a portion of unreacted heavy oil 25 is recycled back to injection reactor 14 by mixing with heavy oil 1 in mixer 63. In simulations of this embodiment 20% of the unreacted heavy oil from distillation tower 62 is recycled, although the embodiment is not limited to the recycling of any specified percentage of unreacted heavy oil from the distillation tower. Mixed heavy oil 26 is heated in heat exchanger 13 before being input to injection reactor 14. The simulation again assumes 40% of the heated heavy oil 2 reacts with syngas and the remaining 60% is the quenching material. The results of the simulation of this embodiment are depicted in Table 2. Note that product crude 21 has a significantly higher API gravity than in the embodiment of FIG. 3. In this embodiment product crude 21 contains 66.9 mole-percent cracked heavy oil components.

TABLE 2

Simulation Results for Recycled Heavy Oil PCU Process Embodiment of FIG. 4

| Process Reference | Flow Volume | Flow Volume kgmole/hr | Temperature °F. | Temperature °C. | Pressure psia | Pressure kpa | Oil Quality API |
|---|---|---|---|---|---|---|---|
| Heavy Oil 1 | 40,000 bbl/day | 528.4 | 199.5 | 93.1 | 169 | 1,165 | 32.8 |
| Recycled Heavy Oil 25 | 5,454 bbl/day | 72.0 | 200 | 93.3 | 169 | 1,165 | |
| Natural Gas 5 Input to Mixer 16 | 10.4 mscf/day | 517.1 | 80 | 26.7 | 178.5 | 1,231 | |
| Steam 7 | 12,320 lb/hr | 310.3 | 372.8 | 189.3 | 178.5 | 1,231 | |
| Heated Boiler Feed Water 23 | 626,500 lb/hr | 15,770 | 357.7 | 180.9 | 1520 | 10,480 | |
| Heated Compressed Air 12 | 109,900 lb/hr | 1,730 | 1050 | 565.6 | 177 | 1,220 | |
| Heated Fuel Mixture 9 | 31,730 lb/hr | 827.4 | 1050 | 565.6 | 177 | 1,220 | |
| Syngas Generated within Injection Reactor 14 | 141,630 lb/hr | 3,155 | 2237 | 1,225 | 167 | 1,151 | |

TABLE 2-continued

Simulation Results for Recycled Heavy Oil PCU Process Embodiment of FIG. 4

| Process Reference | Flow Volume | Flow Volume kgmole/hr | Temperature ° F. | Temperature ° C. | Pressure psia | Pressure kpa | Oil Quality API |
|---|---|---|---|---|---|---|---|
| Heated Heavy Oil 2 | 40,000 bbl/day | 528.4 | 500 | 260 | 167 | 1,151 | |
| Upgraded Heavy Oil 3 | 722,500 lb/hr | 3,754 | 752.9 | 400.5 | 160 | 1,103 | |
| Cooled Upgraded Heavy Oil 4 | 722,500 lb/hr | 3,754 | 120 | 48.9 | 112.5 | 776 | |
| Liquid Product 66 | 576,800 lb/hr | 1,427 | 118.9 | 48.3 | 14.8 | 102 | |
| Sour Crude 65 | 556,100 lb/hr | 961.4 | 118.9 | 48.3 | 14.8 | 102 | |
| Natural Gas 5 Input to Stripping Tower 58 | 1.0 mscf/day | 49.9 | 69.2 | 20.7 | 15.8 | 109 | |
| Gas 67 | 154,400 lb/hr | 2,447 | 110 | 43.3 | 45 | 310 | |
| Wastewater 22 | 1,130 bbl/day | 414.5 | 118.9 | 48.3 | 14.8 | 102 | |
| Exhaust Gas from Furnace 17 | 310 mscf/day | 15,580 | 506.3 | 263.5 | 14.8 | 102 | |
| Product Crude 21 | 40,710 bbl/day | 870.7 | 118 | 47.8 | 15.8 | 109 | 56.6 |

Figure 5:
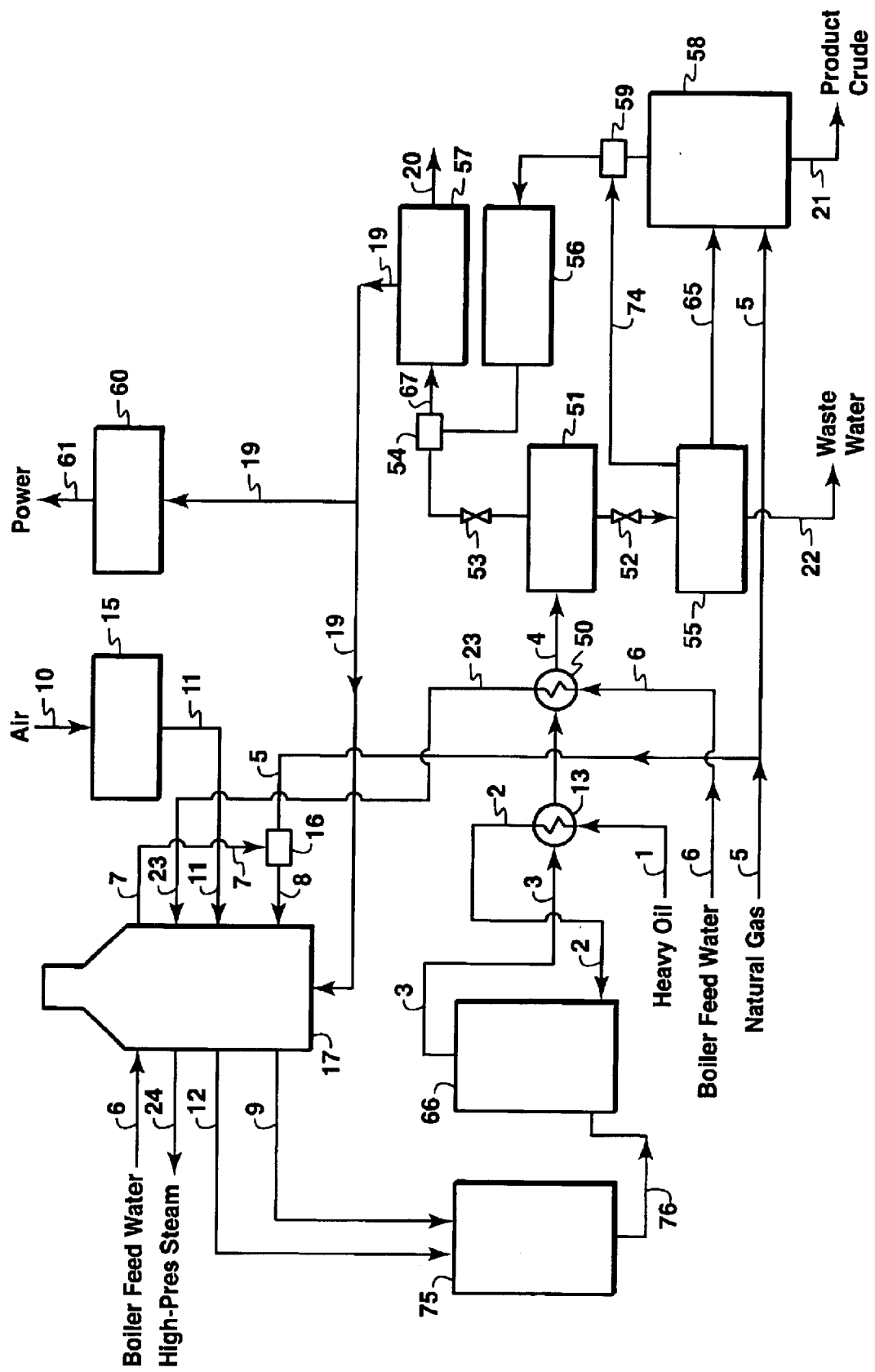
FIG. 5 is a schematic representation illustrating an embodiment of a partial oxidation reactor that may be used in the method of the present invention, with an expanded illustration of heat exchanger and separation equipment.

Another embodiment is depicted in FIG. 5. In this embodiment injection reactor 14 in replaced by partial oxidation (POX) reactor 75 and upgrade reactor 66. Partial oxidation refers to the process of limiting the amount of oxygen that is allowed to react with the fuel mixture so as to ensure that the preponderance of the output products are hydrogen and carbon monoxide, and not carbon dioxide and water. POX reactors are well known in the gas-to-liquids conversion field, as well as in other fields, and this embodiment provides an example of the implementation of the PCU process using well-understood commercially available components. Heated fuel mixture 9 and heated compressed air 12 are fed to partial oxidation reactor 75 to generate syngas 76. Hot syngas 76 is sent through a set of injection nozzles (not depicted) located in upgrade reactor 66. In this embodiment, a high steam to natural gas ratio is used in heated fuel mixture 9 to keep syngas 76 at an approximate temperature of 1400° F. (760° C.). This prevents high temperature damage to the flow line and nozzles used to transfer syngas 76 to upgrade reactor 66. This approximate temperature is not a limitation of this embodiment, but rather is a function of the temperature resistance of the materials used to fabricate the components of the upgrade facility. Simulations of this embodiment again assume 40% of heated heavy oil 2 reacts with syngas and the remaining 60% is the quenching material. Product crude 21 contains 60.7 mole-percent cracked heavy oil, and has an API gravity improvement of 8.4.

TABLE 3

Simulation Results for POX Reactor PCU Process Embodiment of FIG. 5

| Process Reference | Flow Volume | Flow Volume kgmole/hr | Temperature ° F. | Temperature ° C. | Pressure psia | Pressure Kpa | Oil Quality API |
|---|---|---|---|---|---|---|---|
| Heavy Oil 1 | 40,000 bbl/day | 528.4 | 199.5 | 93.1 | 169 | 1,165 | 32.8 |
| Natural Gas 5 Input to Mixer 16 | 20.0 mscf/day | 997.9 | 80 | 26.7 | 178.5 | 1,231 | |
| Steam 7 | 150,600 lb/hr | 3,792 | 372.8 | 189.3 | 178.5 | 1,231 | |
| Heated Boiler Feed Water 23 | 930,000 lb/hr | 23,420 | 450.1 | 232.3 | 1520 | 10,480 | |
| Heated Compressed Air 12 | 154,200 lb/hr | 2,429 | 800 | 426.7 | 177 | 1,220 | |
| Heated Fuel Mixture 9 | 188,050 lb/hr | 4,790 | 800 | 426.7 | 177 | 1,220 | |
| Syngas 76 | 342,250 lb/hr | 8,223 | 1401 | 760.8 | 167 | 1,151 | |
| Heated Heavy Oil 2 | 40,000 bbl/day | 528.4 | 500 | 260 | 167 | 1,151 | |
| Upgraded Heavy Oil 3 | 853,500 lb/hr | 8,751 | 792.5° F. | 422.5 | 160 | 1,103 | |
| Cooled Upgraded Heavy Oil 4 | 853,500 lb/hr | 8,751 | 120 | 48.9 | 112.5 | 776 | |
| Liquid Product 66 | 626,400 lb/hr | 4,356 | 119.7 | 48.7 | 14.8 | 102 | |
| Sour Crude 65 | 484,500 lb/hr | 818.1 | 119.7 | 48.7 | 14.8 | 102 | |
| Natural Gas 5 Input to Stripping Tower 58 | 910 kscf/day | 45.4 | 69.2 | 20.7 | 15.8 | 109 | |
| Gas 67 | 233,400 lb/hr | 4,490 | 110 | 43.3 | 45 | 310 | |

TABLE 3-continued

Simulation Results for POX Reactor PCU Process Embodiment of FIG. 5

| Process Reference | Flow Volume | Flow Volume kgmole/hr | Temperature ° F. | Temperature ° C. | Pressure psia | Pressure Kpa | Oil Quality API |
|---|---|---|---|---|---|---|---|
| Wastewater 22 | 9,538 bbl/day | 3,499 | 119.7 | 48.7 | 14.8 | 102 | |
| Exhaust Gas from Furnace 17 | 520.0 mscf/day | 25,900 | 507 | 263.9 | 14.8 | 102 | |
| Product Crude 21 | 40,170 bbl/day | 806.4 | 119.5 | 48.6 | 15.8 | 109 | API = 41.2 |

Figure 6:
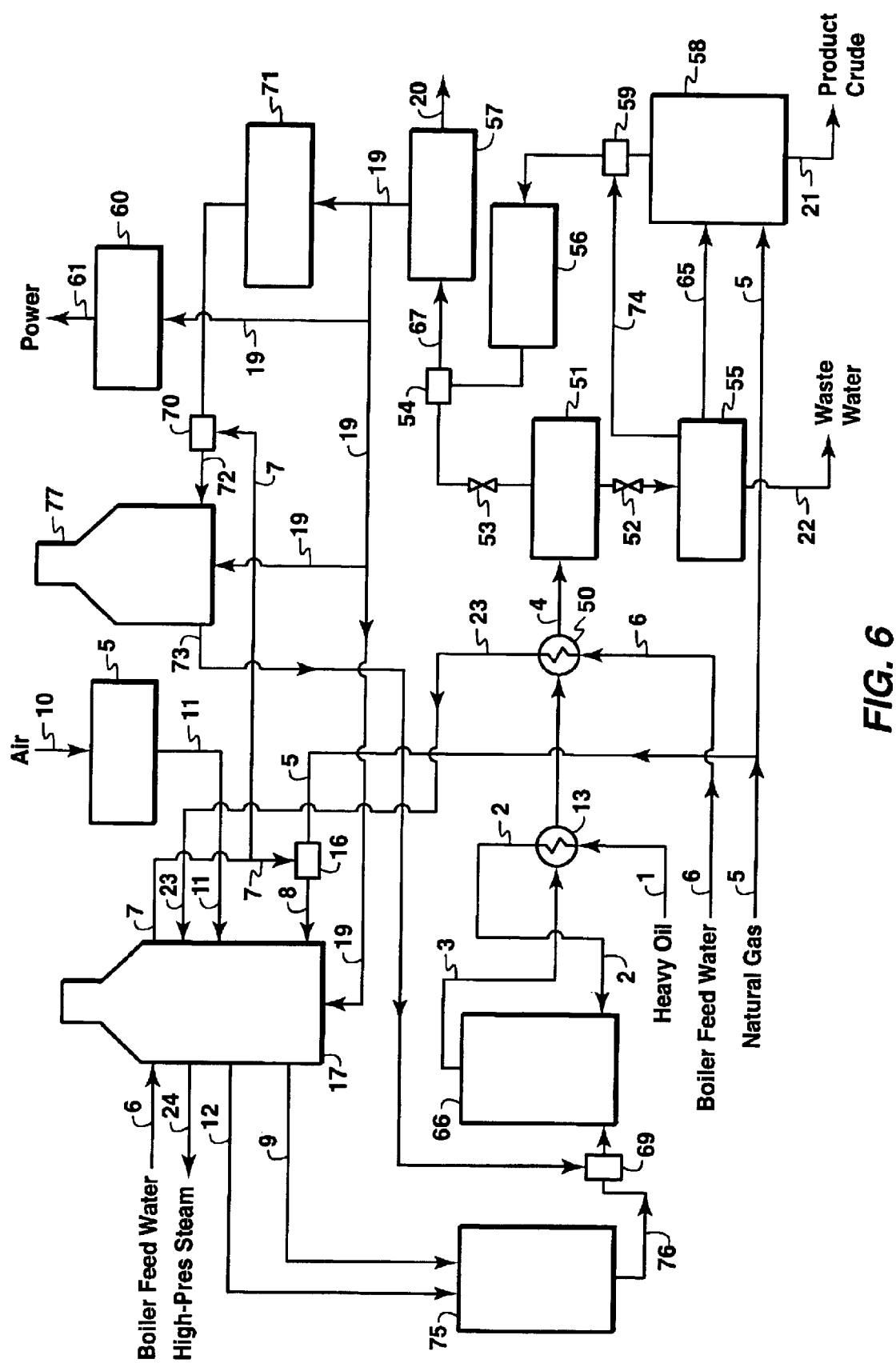
FIG. 6 is similar to FIG. 5, with the addition of recycled tail gas as an input to the partial oxidation reactor.

The embodiment depicted in FIG. 6 is similar to the embodiment of FIG. 5, except that a portion of fuel gas 19 is recycled to upgrade reactor 14. Since fuel gas 19 contains reactive gases, hydrogen, and carbon monoxide, this embodiment has a reduced the demand for natural gas 5 within fuel mixture 9. After fuel gas 19 is compressed in compressor 71, steam is mixed in mixer 70 with fuel gas 19 to mitigate metal dusting corrosion in furnace 77. Mixture 72 is heated in furnace 77 to a temperature preferably in the range 1000 to 1500° F. (538 to 816° C.), and more preferably in the range of 1200 to 1400° F. (649 to 760° C.), and mixed with syngas in mixer 69. In this embodiment, any amount, but preferably from 0 to 70%, of fuel gas 19 can be recycled to mixer 70. Simulations again assumed 40% of heated heavy oil 2 reacts with syngas and the remaining 60% is the quenching material.

Table 4 shows that the usage of natural gas 5 is reduced by 45% due to the simulation's recycling of 50% of the fuel gas 19. This in turn reduces heated compressed air 12 and steam 7 volume requirements. Those reductions in turn lead to the benefits of reducing exhaust gas emissions from furnace 17 and of lowering the wastewater 22 volume. Product crude 21 contains 61.9 mole-percent of cracked heavy oil components. An alternative process scheme based on this embodiment would allow the recycled fuel gas to bypass the gas-treating unit. This alternative would have the advantage of a smaller gas-treating unit and would allow reactive hydrogen sulfide and hydrogen radicals in the untreated fuel gas to aid the upgrade reactions.

TABLE 4

Simulation Results for POX Reactor and Recycled Gas PCU Process Embodiment of FIG. 6

| Process Reference | Flow Volume | Flow Volume kgmole/hr | Temperature ° F. | Temperature ° C. | Pressure psia | Pressure kpa | Oil Quality API |
|---|---|---|---|---|---|---|---|
| Heavy Oil 1 | 40,000 bbl/day | 528.4 | 199.5 | 93.1 | 169 | 1,165 | 32.8 |
| Natural Gas 5 Input to Mixer 16 | 10.5 mscf/day | 521.6 | 80 | 26.7 | 178.5 | 1,231 | |
| Steam 7 | 78,730 lb/hr | 1,982 | 372.8 | 189.3 | 178.5 | 1,231 | |
| Heated Boiler Feed Water 23 | 579,000 lb/hr | 14,580 | 596.3 | 313.5 | 1520 | 10,480 | |
| Heated Compressed Air 12 | 80,630 lb/hr | 1,270 | 800 | 426.7 | 177 | 1,220 | |
| Heated Fuel Mixture 9 | 98,300 lb/hr | 2,504 | 800 | 426.7 | 177 | 1,220 | |
| Syngas 76 | 178,900 lb/hr | 4,299 | 1401 | 760.8 | 167 | 1,151 | |
| Recycled Tail Gas | 174,300 lb/hr | 3,383 | 1401 | 760.8 | 167 | 1,151 | |
| Heated Heavy Oil 2 | 40,000 bbl/day | 528.4 | 500 | 260 | 167 | 1,151 | |
| Upgraded Heavy Oil 3 | 864,400 lb/hr | 8,209 | 797.6 | 425.3 | 160 | 1,103 | |
| Cooled Upgraded Heavy Oil 4 | 864,400 lb/hr | 8,209 | 120 | 48.9 | 112.5 | 776 | |
| Liquid Product 66 | 617,100 lb/hr | 3,990 | 119.1 | 48.4 | 14.8 | 102 | |
| Sour Crude 65 | 490,100 lb/hr | 849.8 | 119.1 | 48.4 | 14.8 | 102 | |
| Natural Gas 5 Input to Stripping Tower 58 | 910 kscf/day | 45.4 | 69 | 20.7 | 16 | 109 | |
| Gas 67 | 255,700 lb/hr | 4,333 | 110 | 43.3 | 45 | 310 | |
| Wastewater 22 | 8,417 bbl/day | 3,088 | 119.1 | 48.4 | 14.8 | 102 | |
| Exhaust Gas from Furnace 17 | 297 mscf/day | 14,780 | 504.5 | 262.5 | 14.8 | 102 | |
| Product Crude 21 | 40,680 bbl/day | 832.5 | 117.5 | 47.5 | 14.8 | 109 | 41.9 |

It should be understood that the preceding is merely a detailed description of specific embodiments of this invention. Other embodiments may be employed and numerous changes to the disclosed embodiments may be made in accordance with the disclosure herein without departing from the spirit or scope of the present invention. For example, each of the above embodiments involve the use of a single injection reactor or upgrade reactor. The PCU process is not so limited. In particular, embodiments of the PCU process in which more than one injection or upgrade reactor are deployed in a series sequence, to thereby facilitate high upgrade efficiencies. The PCU process may also be employed in embodiments in which more than one injection or upgrade reactor are deployed in parallel, so that a higher volume heavy oil upgrade throughput may be attained. Each of these embodiments is within the scope of the present invention. The preceding description, therefore, is not meant to limit the scope of the invention. Rather, the scope of the invention is to be determined only by the appended claims and their equivalents.

We claim:

1. A heavy oil upgrade method comprising:
   a) treating at least a portion of the heavy oil with a hydrogen-containing gas having a temperature above about 1200° F. (649° C.) for less than 10 seconds to form an upgraded heavy oil;
   b) quenching the upgraded heavy oil by mixing the upgraded heavy oil with an unreacted heavy oil; and
   c) stabilizing the mixture of the upgraded heavy oil and unreacted heavy oil for a residence time of from 1 to 60 minutes to form an upgraded oil mixture.

2. The method of claim 1 wherein the gas is the exothermic product of the the ignition of an oxidizing agent and a hydrogen-containing fuel.

3. The method of claim 1 wherein the treatment involves the vaporization of a portion of the heavy oil.

4. The method of claim 1 wherein the treatment involves a predominantly gas phase heavy oil upgrade reaction.

5. The method of claim 2 wherein the hydrogen-containing fuel is a mixture of natural gas and steam.

6. The method of claim 2 wherein the oxidizing agent is compressed air.

7. A heavy oil upgrade method comprising the steps of:
   a) introducing an oxidizing agent and a hydrogen-containing fuel into a reactor vessel;
   b) introducing a heavy oil into the reactor vessel,
   c) igniting the oxidizing agent and the hydrogen-containing fuel in the presence of the heavy oil to initiate a predominantly gas phase upgrade reaction,
   d) quenching the upgrade reaction; and
   e) stabilizing the products of step (d) for a residence time of from 1 to 60 minutes to form an upgraded oil mixture.

8. The method of claim 7 wherein an un-upgraded heavy oil is used to quench the upgrade reaction.

9. A heavy oil upgrade injection reactor comprising:
   a) a reactor vessel,
   b) means for inputting a heavy oil, an oxidizing agent and a fuel in separate input streams into the reactor vessel;
   c) means proximate to the input means for igniting the fuel with the oxidizing agent in the presence of the heavy oil to thereby initiate a localized heavy oil upgrade reaction;
   d) means for inputting a second stream of heavy oil into the reactor vessel for quenching the upgrade reaction, and
   e) means for withdrawing an upgraded oil mixture from the reactor vessel.

10. A heavy oil upgrade ignition injector comprising:
    a) a reaction chamber;
    b) means for inputting heavy oil, fuel, and an oxidizing agent into a first end of the reaction chamber in separate streams; and
    c) means for igniting the fuel and the oxidizing agent to thereby initiate an heavy oil upgrade reaction within the reaction chamber.

11. The apparatus of claim 10, further comprising means for inputting a reaction quenching heavy oil into the injector proximate to the location of the upgrade reaction.

* * * * *